US 6,813,555 B1

(12) United States Patent
Kerner

(10) Patent No.: US 6,813,555 B1
(45) Date of Patent: *Nov. 2, 2004

(54) METHOD FOR MONITORING THE CONDITION OF TRAFFIC FOR A TRAFFIC NETWORK COMPRISING EFFECTIVE NARROW POINTS

(75) Inventor: Boris Kerner, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/088,024

(22) PCT Filed: Aug. 26, 2000

(86) PCT No.: PCT/EP00/08329
§ 371 (c)(1),
(2), (4) Date: Jul. 19, 2002

(87) PCT Pub. No.: WO01/20574
PCT Pub. Date: Mar. 22, 2001

(30) Foreign Application Priority Data

Sep. 14, 1999 (DE) .......................... 199 44 075

(51) Int. Cl.[7] ............................... G06G 7/76
(52) U.S. Cl. ........................................... 701/117
(58) Field of Search .................. 701/117, 118–120, 701/26–27; 340/905, 988, 911; 180/167

(56) References Cited

U.S. PATENT DOCUMENTS

| 4,750,129 A | 6/1988 | Hengstmengel et al. .... 364/436 |
| 5,684,475 A | 11/1997 | Krause et al. .............. 340/934 |
| 5,861,820 A | 1/1999 | Kerner et al. ............... 340/934 |
| 6,522,970 B2 * | 2/2003 | Kerner ....................... 701/117 |

FOREIGN PATENT DOCUMENTS

| DE | 197 53 034 A1 | 11/1997 |
| DE | 198 35 979 A1 | 8/1998 |
| EP | 0 884 708 A2 | 12/1998 |
| JP | 10-197270 | * 7/1998 ........... G01C/21/00 |

OTHER PUBLICATIONS

Matsui et al, "Definition of Congestion Based on Drivers' Consciousness", IEEE 1994.*
Ho et al, "Traffic Flow Modeling and Control Using Artificial Neural Networks", IEEE 1996.*
"Perspektiven der Verkehrsleittechnik" Dieter Rittich, Hans Gerd Zielinski, (1992) Apr., No. 9, ANT Nachrichtentechnisch Berichte, pp. 111–119.
"Traffic Prediction Method by Fuzzy Logic", T. Iokibe, N. Mochizuki, T. Kimura, IEEE, 1993, pp. 673–678.
"Experimental properties of complexity in traffic flow", B. S. Kerner and H. Rehborn, The American Physical Society May, 1996, pp. R4275–R4278.
International Search Report and translation of pertinent portions thereof.
German Search Report and translation of pertinent portions thereof.

* cited by examiner

Primary Examiner—Thu V. Nguyen
(74) Attorney, Agent, or Firm—Crowell & Moring LLP

(57) ABSTRACT

In a method for monitoring traffic conditions in a traffic network with effective bottlenecks, the traffic state is classified, taking account of recorded measured traffic data for one or more traffic parameters, including information on the traffic intensity or the average vehicle speed, into in each case one of a plurality of state phases which comprise at least the state phases of free traffic and synchronized traffic. In the case of an edge at an effective bottleneck, between downstream free traffic and upstream synchronized traffic, the traffic state upstream thereof is classified as a pattern, representative of the respective bottleneck, of dense traffic which includes one or more different consecutive upstream, of different state phase composition; and an associated profile of the traffic parameters is taken into account for the state phase determination.

11 Claims, 5 Drawing Sheets

METHOD FOR MONITORING THE CONDITION OF TRAFFIC FOR A TRAFFIC NETWORK COMPRISING EFFECTIVE NARROW POINTS

BACKGROUND AND SUMMARY OF THE INVENTION

This application claims the priority of PCT International Application No. PCT/EP00/08329, filed 26 Aug. 2000 and German Patent Document 199 44 075.1, filed 14 Sep. 1999, the disclosure of which is expressly incorporated by reference herein.

The invention is related to a method for monitoring and forecasting traffic conditions in a traffic network (particularly a road network) with effective bottlenecks. As used herein, the phrase "effective bottlenecks" is to be understood to include both bottlenecks in the actual sense, (a reduction in the number of usable lanes), and bottlenecks in the broader sense, such as are caused, for example, by one or more incoming feeder lanes, a bend, a grade, a downgrade, a division of a lane into two or more lanes, one or more exits or a bottleneck moving slowly (by comparison with the average vehicle speed in free traffic), for example owing to a vehicle which is being driven slowly.

Various methods for monitoring and forecasting traffic conditions of this generic type are known, and are of particular interest also for diverse telematics applications in vehicles. One aim of these methods is to obtain, from measured traffic data detected at traffic measuring points, a qualitative description of the traffic state at the respective measuring point and its surroundings. Measuring points in this sense include both those installed in a stationary fashion on the route network, and moveable measuring points such as, for example, sample vehicles moving in the traffic (so-called "floating cars") or by a measurement of the traffic flow obtained by means of monitoring from deep space, space or the air.

For the purpose of qualitative description of the traffic state, it is known to divide the latter into various phases, for example into a phase of "free traffic", in which relatively fast vehicles can overtake without a problem, a phase of "synchronized traffic", in which possibilities for overtaking scarcely exist, but a high traffic intensity still prevails, and a phase of "congestion", in the case of which the vehicles are virtually stationary and also the traffic intensity drops to very low values. (See, for example, the journal article by B. S. Kerner and H. Rehborn, "Experimental properties of complexity in traffic flow", Physical Review E 53, R 4275, 1996.) As used herein, "synchronized traffic" is to be understood both as a state in which, because there are scarcely any possibilities of overtaking, all vehicles in different lanes are driven at a very similar, "synchronized" speed, (for example on route sections without approach roads and exits), and a traffic state in which the distribution of speed for the vehicles in different lanes can differ, but there is a tendency for synchronization of the speeds of those vehicles in different lanes which are respectively being driven on an identical route, since there are scarcely any possibilities of overtaking with reference to one driving route.

The phase division is based on the idea of selecting the phases such that each of them corresponds to specific characteristic properties of the traffic flow, making it possible to estimate the temporal and spatial extent of route sections in which the traffic state is in a specific phase. In the journal article by B. S. Kerner, "Experimental Features of Self-Organization in Traffic Flow", Physical Review Letters, Vol. 81, No. 17, page 3797, so called "pinch regions" (regions of "congested synchronized traffic") are selected in the phase of "synchronized traffic", and are subsequently treated specially. These are regions inside synchronized traffic in which it is possible to drive only at very low speeds and in which there is spontaneous formation of short-lived congestion states which can migrate upstream and grow in the process, and which can then possibly lead to a lasting congestion state.

Various methods are already known for monitoring and predicting traffic "congestion points" (frequently called a "moving jam"). See, for example, the automatic congestion dynamics analysis described in German patent document DE 196 47 127 A1, whose content is incorporated herein by reference, and methods known from the literature mentioned there.

In German patent document 198 35 979.9, which is not a prior publication, there is, moreover, a description of the monitoring and forecasting of synchronized traffic, in particular the detection of a phase transition between free and synchronized traffic, and a prediction of the spatial extent of synchronized traffic. This is done by inferring the position of an upstream edge of the latter based on the fact that, at a corresponding upstream measuring point, specific conditions for an induced upstream phase transition from free to synchronized traffic are no longer fulfilled, or widespread congestion has arisen. This method is particularly suitable for detecting the start of a phase of synchronized traffic at an effective bottleneck of the traffic network, and for tracking the temporal development of the synchronized traffic forming upstream of this bottleneck, the downstream edge of which generally remains fixed at the effective bottleneck. An edge fixed at the effective bottleneck is understood in this case as one which remains in the surroundings of this bottleneck. That is, it remains essentially stationary in the surroundings of a stationary effective bottleneck, or moves along essentially synchronously with a moveable effective bottleneck. The location of the effective bottleneck is therefore the one where the downstream edge of the synchronized traffic is momentarily located.

In a related, co-pending German patent application the current traffic conditions are monitored with regard to different state phases, particularly synchronized traffic and a pinch region as well as the phase transition between states of synchronized traffic on the one hand, and free traffic, on the other hand. The future traffic state is predicted on this basis, if required. In particular, this method can be used to estimate the edges of regions of synchronized traffic relatively accurately for current points in time, or to predict future points in time at which such edges are not (or will not be) located at a measuring point, but somewhere between two measuring points. Suitably designed fuzzy logic is preferably used in this case.

In German patent document DE 199 44 077 A1, (not prior art) the current traffic state is monitored with regard to different state phases and, in particular, with regard to synchronized traffic and a pinch region as well as the phase transition between states of synchronized traffic, on the one hand, and free traffic, on the other hand. The future traffic state is predicted on this basis, if required. In particular, this method can be used to estimate the edges of regions of synchronized traffic relatively accurately for current points in time or to predict future points in time at which such edges are not (or will not be) located at a measuring point, but somewhere between two measuring points. A suitably designed fuzzy logic is preferably used in this case.

European patent document EP 0 884 708 A2 discloses a method for predicting traffic conditions in a traffic network having nodes and edges running therebetween. Detection data referring to the current traffic are acquired and transmitted to a control center which uses them to describe the current traffic state on the traffic network in the form of respective traffic phases which represent the state on an edge or an edge section. It predicts the traffic state by calculating at least the movements and future positions of the traffic phases. The phases are described in binary fashion in the form of the phases of "free" and "congested"; in the five phases of "free", "busy", "dense", "sluggish" and "congested"; or by using another number of different phases. For prediction, use is made of phase boundary speeds which, for example, are calculated by linear regression with the aid of current and earlier detection data, or as the quotient of the difference between the incoming and departing flow at the phase boundary and the difference between the vehicle density upstream and downstream of the phase boundary.

One object of the invention is to provide a method for reliably monitoring the current traffic state, specifically even in a region upstream of effective bottlenecks, and for reliably predicting the future traffic state.

This and other objects and advantages are achieved by the method according to the invention, in which the traffic state upstream of an effective bottleneck is classified to a particular pattern of dense traffic, whenever an edge fixed at the relevant effective bottleneck is detected between downstream free traffic and upstream synchronized traffic (that is, when dense traffic forms upstream of the bottleneck). The pattern classification of the traffic state includes a division of the traffic upstream of the bottleneck into one or more consecutive upstream regions of different state phase composition. Moreover, the pattern classification includes a profile, dependent on state phase, time and location, of traffic parameters taken into account for the state phase determination, such as average vehicle speed, traffic flow and/or traffic density.

In the case of increasing traffic, and specifically at effective bottlenecks (which may be primarily stationary bottlenecks, but in some incidences may include moveable bottlenecks such as very slowly moving road-construction or road-maintenance vehicles or migrating building sites), a formerly free traffic state will frequently be initially transformed into a so-called region of synchronized traffic upstream of the bottleneck, whilst resulting (depending on further traffic) in a pattern, typical of the bottleneck, of dense traffic. In the minimum version, this pattern may comprise only the region of synchronized traffic adjoining the effective bottleneck upstream. The formation of a pinch region is also observed in the case of increasing traffic volume and/or appropriate route infrastructure. Congestion points can develop from this pinch region and propagate upstream, since it is possible for free or synchronized traffic or a pinch region to be present between each two congestion points. The region in which the widespread congestion propagates upstream (by contrast with the localized congestion occurring in pinch regions) is denoted as a region of "moving widespread congestion" (See e.g, B. S. Kerner, "Experimental features of the emergence of moving jams in free flow traffic, J. of Physics A: Mathematical and General, vol. 33, pp L221–L228 (2000).)

As a result of these findings, in the case of detection of synchronized traffic moving upstream of a bottleneck the method according to the invention makes it possible to use comparatively fewer current or predicted measured traffic data to assign the traffic state to a fitting pattern typical of the respective bottleneck. Further analysis or evaluation and also prediction of the future traffic state can then be performed on the basis of this pattern recognition with the aid of comparatively little data material which is to be processed, and consequently with correspondingly slight computation outlay. A further essential advantage of this method is that, by contrast with mathematical traffic state models with many parameters to be validated, it includes a pattern-based modeling without parameters to be validated.

One embodiment of the invention permits the pattern classification of the traffic state even when a pattern, arising initially at an effective bottleneck, of dense traffic has extended beyond one or more further, upstream effective bottlenecks. The overarching pattern is built up from the same regions as an individual pattern including only one effective bottleneck. That is, the overarching pattern also comprises the characteristics of regions of "synchronized traffic", "pinch regions" and "moving widespread congestion".

According to a feature of the invention, the pattern determined as a function of time and location for a respective bottleneck is determined empirically from recorded traffic measured data and stored in a fashion which can be called up. As a result, it is possible at any later point in time at which a fixed edge is detected at the bottleneck between downstream free traffic and upstream synchronized traffic, to select the pattern profile which best fits the measured traffic data currently recorded or predicted for the relevant point in time from the stored pattern profiles. The latter can be used as a current or predicted traffic state for the corresponding route section of the traffic network upstream of the bottleneck.

In another embodiment of the invention, a dense traffic state upstream of an effective bottleneck is distinguished as a function of vehicle influx in accordance with three pattern variants, and each of the three variants is assigned a corresponding time- and location-dependent pattern profile for one or more of the important traffic parameters of "mean vehicle speed", "traffic flow" and "traffic density". In a first variant, the pattern comprises only one region of synchronized traffic. In a second variant, the pattern additionally comprises a pinch region adjoining upstream, and in a third pattern variant there is in addition a region of moving widespread congestion upstream of the pinch region. The associated, generally time-dependent edge positions between the various pattern regions are determined by respectively suitable methods, for example of the type mentioned at the beginning.

Still another embodiment of the invention permits the detection and tracking of overarching patterns of dense traffic in the considered traffic network as a function of the vehicle flows. In particular, the location and time of the resolution of a respective overarching pattern and the sequence of the individual regions of "synchronized traffic", "pinch region" and "moving widespread congestion" can be determined in each overarching pattern as a function of the vehicle flows. Moreover, the temporal and spatial characteristic of congestion points propagating upstream by means of regions of synchronized traffic and/or pinch regions can be predicted when a region of "moving widespread congestion" overlaps in an overarching pattern with regions of synchronized traffic and/or pinch regions.

A further refinement of this measure of determining the edge position includes a temporal tracking of the positions of diverse edges between the various pattern regions and/or congestion points in overarching patterns and/or the detection of newly occurring overarching patterns, so that the position and extent of each of the regions (which differ in their state phase composition) of an individual or overarching pattern can be tracked in temporal development.

In still another embodiment of the invention, the expected travel time required for traversing the route section in which the individual or overarching pattern of the dense traffic is located is additionally determined as a function of time and stored. The stored travel time information can be used, for example, directly within the framework of a method for estimating travel times, currently to be expected or to be expected in future for prediction, for travelling specific, prescribable routes of the traffic network.

Finally, according to still another embodiment of the invention, the positions of associated edges and the influx to the pattern are detected currently after detection of an individual or overarching pattern. This information is used to select the pattern profile which best fits therewith from the stored pattern profiles, and to carry out a prediction on the further development of the pattern of dense traffic at the relevant effective bottleneck. This can comprise, in particular, a prediction of relevant traffic state parameters such as average vehicle speed, traffic flow and/or traffic density and, if required, also be travel time to be expected.

Other objects, advantages and novel features of the present invention will become apparent from the following detailed description of the invention when considered in conjunction with the accompanying drawings.

DETAILED DESCRIPTION OF THE DRAWINGS

Figure 1:
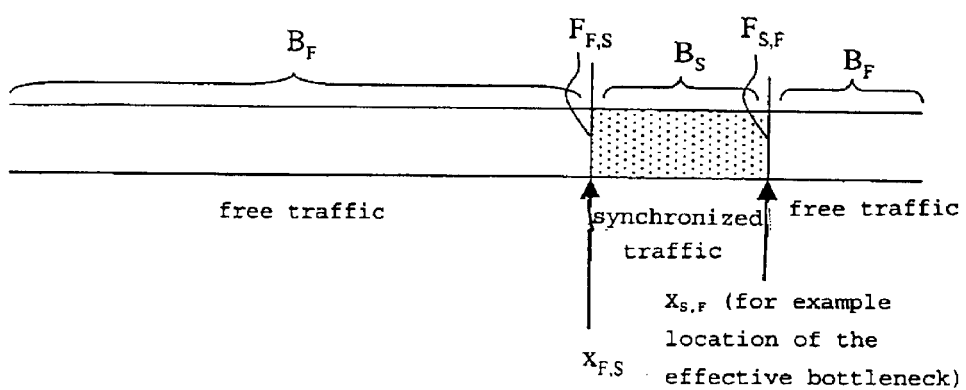
FIG. 1 is a diagram which shows, for a particular point in time, a route section of a road traffic network with an effective bottleneck, and an upstream pattern of dense traffic, which comprises a region of synchronized traffic.

FIG. 1 shows an example of a route section of a directional lane of a road traffic network (for example, a motorway section) whose traffic state is estimated by a traffic center for the current point in time. (That is, it is determined by computer, and is predicted for future points in time.) Permanently installed and/or moveable measuring points are provided, as required, in order to detect measured traffic data serving this purpose. The measured data are received as appropriate by the traffic center and appropriately evaluated by a computation unit there. Such traffic state monitoring systems are discussed, for example, in the literature referred to previously.

The present traffic state monitoring system utilizes a monitoring method that includes detection of typical pattern profiles of dense traffic upstream of effective bottlenecks and classification of the same. This information makes it possible to estimate the current traffic state comparatively easily and reliably, and also to predict the traffic state to be expected in future in this route region.

FIG. 1 shows an example in which an effective bottleneck is located at a route position $x_{S,F}$. Due to correspondingly high traffic volume, an edge $F_{S,F}$ fixed there has formed between a downstream region $B_F$ of free traffic and an upstream region BS of synchronized traffic. The formation of such an edge $F_{S,F}$ can be detected, for example, with the aid of the method described in German patent document 198 90 35 979.9, referred to previously. In this case, it can be a spatially fixed bottleneck such as, for example, a permanent lane reduction at this point; but it may also be a moveable bottleneck, as formed, for example, by a "migrating building site" or very slowly moving road-construction vehicles.

Upon detection of such a fixed edge $F_{S,F}$ between downstream free traffic $B_F$ and upstream synchronized traffic $B_S$, the method then classifies the traffic state upstream of the effective bottleneck into a pattern of dense traffic, using the experimentally observed fact that in increased traffic volume, entirely typical pattern profiles of dense traffic form upstream of such effective bottlenecks. That is, the traffic state there can be classified into certain typical variants of a pattern of dense traffic.

Treating the traffic state in this region as a pattern of dense traffic then permits a comparatively reliable prediction of the future traffic state and of the travel time required to traverse this region with a relatively low computational outlay and relatively few items of measured data information. For this purpose, a specific pattern of the dense traffic is assigned upstream of the respective effective bottleneck, in particular at all points with approach roads, on the basis of measurements of the traffic (that is, measurements of traffic parameters representative the traffic state). Such a pattern of dense traffic includes appropriate time-dependent and location-dependent profiles of the considered traffic parameters such as the average vehicle speed, the traffic flow and/or the traffic density, and preferably also the travel time corresponding to the pattern respectively present. It should be noted that these temporal/spatial profiles of the pattern of dense traffic deviate clearly, by more than a prescribed measure, from the corresponding profiles of free traffic. Furthermore, it should also be noted that the respective temporal/spatial profiles (assigned to the pattern of dense traffic) of the traffic parameters which are considered (such as the average vehicle speed, the traffic flow and/or the traffic density), and the travel time belonging to the pattern, have characteristic properties in the case of each effective bottleneck. These properties are characteristic in the sense that they can be reproduced and predicted for different times, for example different times of day and/or different days. That is, these characteristic properties, including their characteristic time dependence, can be predicted without validating the parameters of a traffic prediction model used.

As has been said, in the example of FIG. 1 the pattern of dense traffic comprises solely the region $B_S$ of synchronized traffic with a downstream edge $F_{S,F}$ at the location $X_{S,F}$ of the effective bottleneck and an upstream edge $F_{F,S}$, whose position $X_{F,S}$ is determined by measurement and computation and is tracked for its temporal development. The upstream edge $F_{F,S}$ is adjoined upstream by a further region $B_F$ of free traffic.

Figure 2:
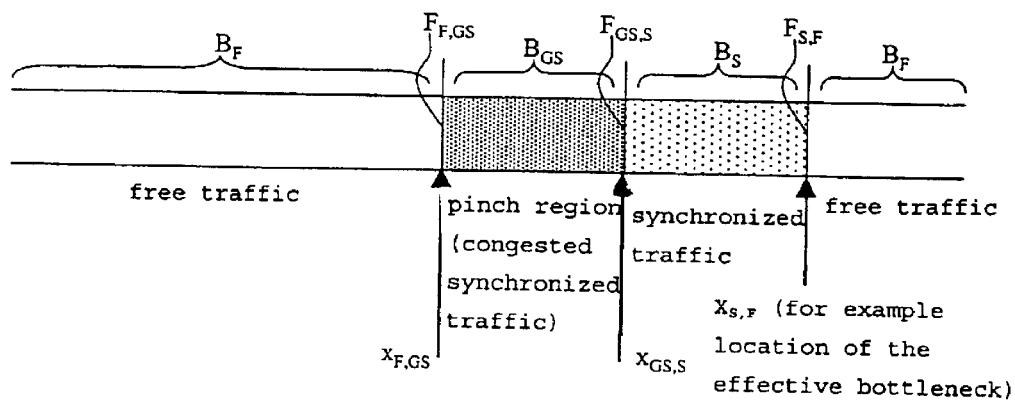
FIG. 2 is an illustration similar to FIG. 1, but for a pattern at a particular point in time of dense traffic which also includes a pinch region.

A further, typically occurring variant of the pattern of dense traffic is illustrated in FIG. 2 and includes, in addition to the region Bs of synchronized traffic, a pinch region $B_{GS}$ adjoining upstream at the upstream edge $F_{GS,S}$ thereof. In such a pinch region (that is, congested synchronized traffic), narrow congestion points arise in otherwise synchronized traffic, but they are not individually tracked. Division of the traffic state into the phases of "free traffic", "synchronized traffic" with or without "pinch regions" and "congestion point", are described, for example, in the above-mentioned German patent document DE 199 44 077 A1 in which suitable measures are also specified for temporal tracking of the position $X_{GS,S}$ of the downstream edge $F_{GS,S}$, and the position $X_{F,GS}$ of the upstream edge $F_{F,GS}$, at which a region $B_F$ of free traffic adjoins upstream in turn.

Figure 3:
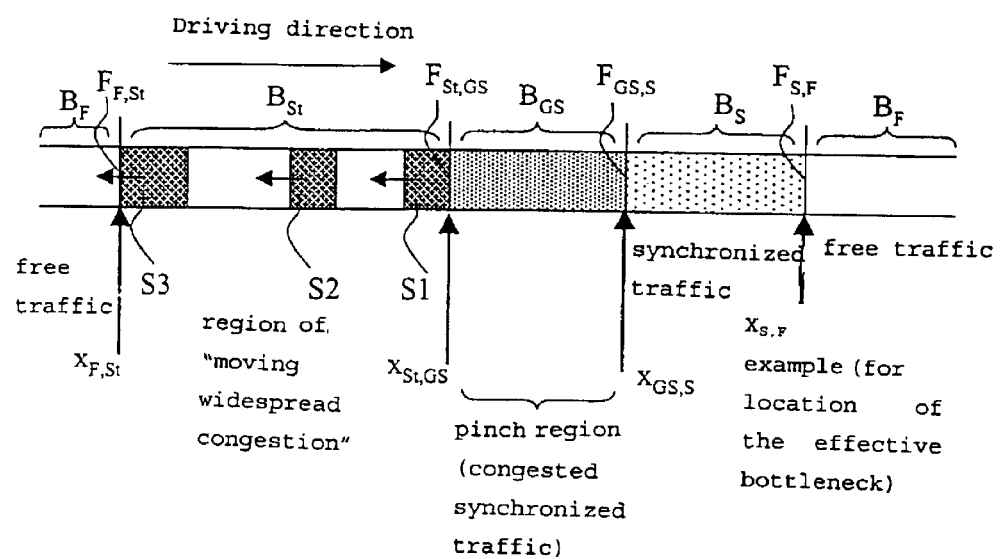
FIG. 3 is an illustration includes a region of moving widespread congestion at a particular point in time.

Given a sufficiently large traffic volume and/or an appropriate route infrastructure, a pattern of dense traffic as illustrated in FIG. 3 can be formed as a further, fully expressed variant. In addition to the region $B_S$ of synchronized traffic and the pinch region $B_{GS}$ adjoining upstream thereof, this comprises a region $B_{St}$ (adjoining upstream thereof) of moving widespread congestion which is finally adjoined upstream again by a region $B_F$ of free traffic. In other words, this classified pattern of dense traffic upstream of an effective bottleneck includes the three regions, occurring consecutively upstream: of synchronized traffic $B_S$, congested synchronized traffic (pinch region) $B_{GS}$ and moving widespread congestion $B_{St}$.

FIGS. 2 and 1 show reduced forms in which the region $B_{St}$ of "moving widespread congestion" and, additionally, the pinch region $B_{GS}$ are lacking, such as is the case, in particular, in the starting phase of the complete pattern of FIG. 3. In other words, the complete pattern according to FIG. 3 develops upstream of an effective bottleneck, typically in the sequence of FIGS. 1 to 3, because the region $B_S$ of synchronized traffic firstly arises at the effective bottleneck. The pinch region $B_{GS}$ and possibly also the region $B_{St}$ of moving widespread congestion are then formed upstream of the region BS when the traffic volume remains sufficiently large and/or is permitted by the infrastructure of the corresponding route section.

The region $B_{St}$ of moving widespread congestion comprises individually trackable widespread congestion which propagates upstream such as, for example, the congestion points S1, S2, S3. (The congestion point S3, situated farthest upstream, represents the last congestion point at the point in time considered.) In this case, the state phase of "congestion point" is understood, as usual, as a structure, moving upstream, of the traffic flow in which both congestion point edges move counter to the driving direction. Within the state phase of "congestion point", both the average vehicle speed and the traffic flow are very small. In the course of time a plurality of mutually spaced congestion points S1, S2, S3 are frequently formed upstream of the pinch region $B_{GS}$, which consequently form the region $B_{St}$, adjoining upstream, of "moving widespread congestion". Between the individual congestion zones S1, S2, S3, the traffic state can have the state phase of free traffic and/or synchronized traffic with or without pinch regions. The position $X_{F,St}$ of the upstream edge $F_{F,St}$ of the last upstream congestion point S3 forms the transition to the region $B_F$ of free traffic adjoining upstream.

In order to classify the patterns relative to the respective effective bottleneck, the first step in applying the present method is to select all points in the traffic network where effective bottlenecks are located. Thereafter, experimental traffic data are used as a basis for allocating either the "complete" pattern (FIG. 3) or one of the two said "abridged" patterns (FIGS. 1,2) to each effective bottleneck, depending on the traffic volume in the surroundings of the effective bottleneck. Each of these patterns additionally includes an associated time-dependent and/or location-dependent profile of the various traffic parameters such as, for example, average vehicle speed, the vehicle density, the travel time, etc. These time-dependent and/or location-dependent profiles are determined not only by the pattern, but also by the respective effective bottleneck.

As mentioned above, according to the present traffic monitoring method, the temporal/spatial profile of the pattern of dense traffic, typical of a particular bottleneck, is determined in advance empirically with the aid of appropriate traffic measurements in the region upstream of the respective effective bottleneck, and is stored, in particular with regard to temporal/spatial profiles of the essential traffic parameters considered, such as the average vehicle speed and/or the traffic flow and/or the traffic density. For this purpose, it is established and stored for various values of the influx to the relevant bottleneck whether the pattern relating to the appropriate point in time comprises only the region $B_S$ of synchronized traffic corresponding to FIG. 1, the region $B_S$ of synchronized traffic and the pinch region $B_{GS}$ in accordance with FIG. 2, or all three different pattern regions $B_S$, $B_{GS}$ and $B_{St}$ in accordance with FIG. 3. For each of these three pattern variants, the temporal/spatial profile of the average vehicle speed, the traffic flow and/or the traffic density is assigned and stored. In addition, the travel time to be expected is preferably determined and stored for each of these three pattern variants for the respective effective bottleneck.

Specifically, for each bottleneck and for the various influxes to the relevant bottleneck, the position $X_{S,F}$ of the downstream edge $F_{S,F}$ of the region Bs of synchronized traffic (that is, the location of the effective bottleneck), the position $X_{GS,S}$ of the edge $F_{GS,S}$ between the region $B_S$ of synchronized traffic and the pinch region $B_{GS}$ adjoining upstream, and the position $X_{St,GS}$ of the edge $F_{St,GS}$ between the pinch region $B_{GS}$ and the region $B_{St}$ adjoining upstream, of moving widespread congestion are determined as a function of the influx to each of the said edges and stored.

In the current traffic state monitoring operation, after establishing an edge $F_{S,F}$, fixed at an effective bottleneck, between a downstream region $B_F$ of free traffic and a region $B_S$ of synchronized traffic forming upstream, the position $X_{F,S}$ of the upstream edge $F_{F,S}$ thereof (which in accordance with FIG. 1 is adjoined, in turn, by a region $B_F$ of free traffic) is then determined. In addition, the influx to this edge $F_{F,S}$, or alternatively the influx to the associated effective bottleneck is detected. With the aid of these input data, the best-fitting pattern variant of dense traffic is then selected from the store and used (in particular, the associated temporal/spatial profile of the average vehicle speed, traffic flow and/or the traffic density and the associated time-dependent travel time). Starting from the currently selected pattern profile, a prediction of the further development of the pattern is then made with the aid of the continuously determined current position $X_{F,S}$ or the edge $F_{F,S}$ between the region Bs of synchronized traffic and the region $B_F$, adjoining upstream, of free traffic, and with the aid of the influxes to the respective bottleneck. This includes, in particular, a prediction as to whether there will form from the initial pattern in accordance with FIG. 1 one of the two other pattern variants in accordance with FIGS. 2 and 3, and/or when and how the pattern of dense traffic will form back again into the state of free traffic at the relevant effective bottleneck.

When, predicted currently or for the future, the pattern of dense traffic at the respective bottleneck also contains the pinch region $B_{GS}$ in accordance with FIG. 2, the positions $X_{St,GS}$, $X_{GS,S}$ of the two edges $F_{St,GS}$, $F_{GS,S}$ limiting this region $B_{GS}$ are then also determined continuously for this region as, for example, described in German patent document DE 199 44 077 A1, mentioned previously. In addition, the associated influx to the bottleneck in question is determined, in turn. This output information is then used in turn, to select from the stored pattern profiles that pattern variant and the corresponding temporal/spatial profile of the traffic parameters being considered and of the travel time to be expected from the stored patterns which best fits these input data. On the basis of the selected pattern profile, an improved prediction of the temporal/spatial profile of the traffic parameters considered, such as in particular, the average vehicle speed, the traffic flow and/or the traffic density, and the associated time-dependent travel time is then made.

When the pattern or the predicted pattern also contains the region $B_{St}$ of moving widespread congestion, the temporal development of the individual congestion points S1, S2, S3 there is tracked by means of a method (applied upstream of the upstream edge $F_{St,GS}$ of the pinch region $B_{GS}$) for dynamic congestion tracking and prediction, as described, for example, in the above-mentioned German patent document DE 196 47 127 A1, and the congestion points are appropriately considered when determining the associated travel time to be expected.

The above-described method according to the invention can be used, with a relatively low computational outlay, to estimate the current traffic state upstream of effective bottlenecks even in the case of a relatively large traffic volume, and to predict the future by using a pattern recognition process which utilizes the empirically observed fact that a characteristic pattern of dense traffic forms upstream of such effective bottlenecks in the case of a relatively large traffic volume. This pattern comprises at least one region of synchronized traffic adjoining the effective bottleneck upstream, possibly a pinch region adjoining upstream and, in addition, when it is fully expressed, an adjoining region of moving widespread congestion. By using suitable calculating methods, the edges of the individual pattern regions and the respectively associated temporal/spatial profiles of the important traffic parameters representative of the traffic state, such as average vehicle speed, traffic flow and traffic density, can be estimated and predicted very reliably. Moreover, this offers the possibility of comparatively reliable predictions of travel time for trips made via such effective bottlenecks.

Whereas the above description of the method considered the case of a pattern of dense traffic forming at an effective bottleneck without influencing further effective bottlenecks, the present method is also suitable for the case of a plurality of effective bottlenecks involved in a pattern of dense traffic, as will be explained in more detail below. This case arises when the upstream end of a pattern belonging to a first effective bottleneck reaches the position of a second effective bottleneck which is situated closest upstream to the first effective bottleneck. Depending on the development of the pattern of dense traffic, it is possible, in addition to the second effective bottleneck, to incorporate one or more additional consecutive upstream effective bottlenecks into such an extended pattern of dense traffic. The patterns, extending beyond a plurality of effective bottlenecks, of dense traffic may be denoted as "overarching" patterns of dense traffic, by contrast with the pattern of dense traffic which is to be denoted as an "individual pattern" and contains only one effective bottleneck.

The development of such an overarching pattern starts at the point in time in which the upstream end of a first pattern, belonging to the said first, downstream effective bottleneck, reaches the position of the second effective bottleneck, situated closest upstream. Since the production of synchronized traffic from free traffic at each effective bottleneck is a phase transition of "first order" which arises from every interruption of the traffic which is greater than a critical interruption, the occurrence of the upstream end of the first, downstream pattern of dense traffic can trigger this phase transition. This phase transition occurs when, depending on the traffic volume and the route infrastructure, the state of free traffic at the upstream effective bottleneck was already metastable in any case with the result that the occurrence of the upstream end of the pattern, belonging to the first effective bottleneck, of dense traffic "triggers" the phase transition there. As a result of this phase transition, a region of synchronized traffic or a pinch region is then formed in turn farther upstream of the upstream, second effective bottleneck.

When the pattern of dense traffic occurring at the upstream effective bottleneck is one of the reduced forms shown in FIGS. 1 and 2, this last-mentioned region combines with the region of synchronized traffic or the pinch region of such pattern to form an overarching pattern, which is regarded as a newly arising pattern jointly assigned to the two effective bottlenecks, and which is developed further in a fashion similar to an "individual" pattern. The development of the overarching pattern (that is, the temporal and spatial development of the edges of the various pattern regions) is then a function of the properties of the two effective bottlenecks incorporated. As in the case of the "individual" pattern, the overarching pattern allocated to the two bottlenecks is stored with the corresponding time-dependent and/or location-dependent profile of the various traffic parameters considered, and is taken into account in the further monitoring and prediction of traffic states.

The procedure outlined for incorporating an effective bottleneck which is respectively next upstream, which is achieved by a downstream pattern of dense traffic, is carried out upstream successively for all effective bottlenecks from one effective bottleneck to the next. It is possible thereby to allocate to a traffic network one or more overarching patterns which in some cases can achieve a substantial extension of, for example, several tens or even hundreds of kilometers. Each overarching pattern comprises a sequence of complete individual patterns corresponding to FIG. 3 and/or reduced patterns corresponding to FIGS. 1 and 2. Moreover, an overarching pattern can also have a form in which a region of "moving widespread congestion", which has arisen in a pattern, situated downstream, of dense traffic, overlaps with a region of synchronized traffic and/or a pinch region in a pattern, situated upstream, of dense traffic. This is possible by virtue of the fact that moving widespread congestion passes through freely upstream both by means of synchronized traffic and by means of pinch regions. Moreover, the speed of the downstream edge of each instance of moving widespread congestion is a characteristic quantity whose mean value does not depend on whether an instance of moving widespread congestion passes through by means of free traffic or by means of synchronized traffic or by means of pinch regions.

Since a plurality of regions of moving widespread congestion of various "full" patterns of dense traffic can arise simultaneously in relation to corresponding effective bottlenecks, a plurality of overlaps of the various regions of moving widespread congestion with regions of synchronized traffic and/or pinch regions can exist in an overarching pattern. In this case, the congestion points in each region of "moving widespread congestion" always move upstream, and their temporal development can be observed with the aid of one of the above-mentioned conventional congestion tracking methods, as a result of which it is possible to track the temporal characteristic of the overlaps correspondingly. This information on the temporal variation of the overarching pattern from the movement of the various congestion points is likewise stored as belonging to the overarching pattern of dense traffic, and can be taken into account by appropriately calling up the overarching pattern for a prediction of the traffic in the traffic network considered.

This mode of procedure is based on the finding that congestion points move upstream as self-contained traffic objects by means of the traffic with the state phases of free traffic or synchronized traffic. When, thus, a region of moving widespread congestion of a pattern, belonging to one or more downstream effective bottlenecks, of dense traffic arrives at an upstream effective bottleneck, widespread congestion points thereat easily move further beyond the upstream effective bottleneck. However, when the preconditions required therefor with regard to traffic volume and bottleneck characteristics are fulfilled, they can trigger the phase transition from free to synchronized traffic if no synchronized traffic has yet occurred. This phase transition therefore occurs relatively easily, because the maximum traffic flow beyond the bottleneck in the state of synchronized traffic is lower than in the state of free traffic. Given free traffic with sufficiently high traffic flow, even a relatively small traffic interruption such as is represented, for example, by widespread congestion passing through is enough to "trigger" transition into the state of synchronized traffic.

If, now, a region of moving widespread congestion as upstream region of a "full" individual pattern or as a corresponding subregion of an overarching pattern has reached with its upstream end the upstream neighboring effective bottleneck and triggered the formation there of synchronized traffic, an individual or overarching pattern having the structures in accordance with FIGS. 1 to 3 can form in turn upstream of this bottleneck when this is induced by the traffic volume and the route infrastructure, it being possible for this pattern formation to be accomplished or developed further virtually independently of the pattern structure at effective bottlenecks situated downstream.

The production of regions of synchronized traffic or pinch regions and of regions of moving widespread congestion can be understood and detected from the following considerations. In free traffic, the total traffic outflow Q at the cross section of a respective effective bottleneck is the same size on average as the total upstream net traffic influx Qn to the localization point of the effective bottleneck, taking account of all approach roads and exits in the relevant region. In this case, the localization point of an effective bottleneck is that point where the downstream edge between synchronized traffic, which arises from the existence of this effective bottleneck, and free traffic is localized downstream thereof. In other words, this net traffic influx to the effective bottleneck is the total traffic flow of all vehicles which must be driven through the associated localization point coming from all possible directions. The traffic flow at the cross section of each effective bottleneck is then limited in the state phase of synchronized traffic to a certain maximum traffic flow $Q_{smax}$ which drops with a rising proportion of lorries in the traffic flow. Consequently if during a period $\Delta t$ greater than a certain first minimum period $\Delta t_1$ the net traffic influx Qn is on average more than a certain first excess value $\Delta Q_1$ above the maximum traffic flow $Q_{smax}$ of the state phase of synchronized traffic, the "excess" vehicles, whose number is yielded as appropriate time integral over the flow difference, must be "stored" upstream of the localization point of the effective bottleneck.

This is the reason why in the state phase of synchronized traffic a pinch region can arise in which these excess vehicles are stored in the typical temporary "narrow" congestion point. The specified criterion $Qn-Q_{smax} \geq \Delta Q_1$ for a time interval $\Delta t \geq \Delta t_1$ can therefore be used as criterion for the production of the reduced pattern form in accordance with FIGS. 1 and 2, and most accurately when the net influx Qn corresponds to free traffic upstream of the upstream edge $F_{F,S}$ of synchronized traffic in accordance with FIG. 1 for each direction of influx and outflow.

When the difference $Qn-Q_{smax}$ is on average above a second excess value $\Delta Q_2$ during a period $\Delta t$ greater than or equal to a second minimum period $\Delta t2$, the second excess value $\Delta Q_2$ being greater than the first excess value $\Delta Q_1$ and/or the second minimum time interval $\Delta t_2$ being greater than the first minimum time interval $\Delta t_1$, it is necessary for yet more excess vehicles to be stored upstream of the localization point of the effective bottleneck, for which reason the region of moving widespread congestion arises upstream of the pinch region. In this case, the excess vehicles are stored not only in temporary narrow congestion points, but also in lasting widespread ones. This criterion can therefore be used to detect a formation of the full pattern in accordance with FIG. 3, and is at its most exact when the total net influx Qn corresponds to free traffic upstream of the upstream edge $F_{F,GS}$ of the pinch region in accordance with FIG. 2, once again for each direction of influx and outflow.

Alternatively, another criterion can be formulated for the production of the region of moving widespread congestion upstream of the pinch region. This criterion is based on the fact that in a direction "j" of influx or outflow the region of moving widespread congestion arises upstream of the pinch region when the total associated net influx Qnj of this direction "j" in the free traffic upstream of the upstream edge $F_{F,GS}$ of the pinch region in accordance with FIG. 2 is sufficiently large by comparison with the average total flow $Q_{nout,j}$ in this direction "j" downstream of narrow congestion points of the pinch region. This alternative criterion points consequently to the production of the region of moving widespread congestion upstream of the pinch region when the difference $Qn_j-Q_{nout,j}$ for a period $\Delta t$ of at least one associated third minimum period $\Delta t_3$ is on average greater than or equal to an associated third excess value $\Delta Q_3$. In this case, for the three described cases the three minimum periods $\Delta t_1$, $\Delta t_2$, $\Delta t_3$ are, just like the three excess values $\Delta Q_1$, $\Delta Q_2$, $\Delta Q_3$ for the respective effective bottleneck or for the respective group of effective bottlenecks which are responsible for an overarching pattern are prescribed variables, while the maximum traffic flow $Q_{smax}$ in the synchronized traffic and the average total flow $Q_{nout,j}$ downstream of narrow congestion points of a direction "j" are variables whose values are to be determined from experimental traffic data for each effective bottleneck.

An overarching pattern which can be stored with its temporal and spatial characteristic and can be called up to be used for a traffic prediction can not only arise due to overlaps of regions of moving widespread congestion with regions of synchronized traffic and/or pinch regions, and with the movement of the congestion point, but can be realized at least by means of the two following processes.

In a first case, in the course of time the upstream end of a pattern of dense traffic firstly reaches the point of the effective bottleneck next upstream, after which the upstream end of the partial pattern, formed by the last effective bottleneck as upstream part of the further extending overarching pattern, of dense traffic reaches a bottleneck next upstream, etc. This process can last for hours and be predicted, since the development of each individual pattern at each effective bottleneck can be predicted as part of the overarching pattern. The corresponding characteristic of this process of the production and the further temporal and spatial development of the overarching pattern is stored and is available in a fashion which can be called up for a traffic prediction in the traffic network.

As a second case, it can be that the previously described process of the production of an overarching pattern is interrupted by virtue of the fact that the traffic volume in the surroundings of the effective bottleneck next upstream is too low for a pattern of dense traffic to arise there. However, at an effective bottleneck farther upstream some moving congestion points can nevertheless once again trigger a pattern, corresponding to this bottleneck, of dense traffic. Because they propagate upstream, the congestion points can be situated at a relatively large distance of, for example, several kilometers upstream of that pattern of dense traffic or of the associated effective bottleneck where they were originally produced in the associated region of moving widespread congestion. They can therefore move independently of the temporal and spatial development of the remainder of the pattern of dense traffic, and can therefore trigger new "full" or "reduced", or else "overarching" patterns at different upstream bottlenecks independently of whether the associated pattern of dense traffic otherwise still exists or not. All these processes can be stored in a fashion which can be called up for a prediction of the production of one or more individual patterns of dense traffic and/or one or more overarching patterns of dense traffic.

It may be remarked that the pattern formation processes described above are not to be understood only in terms of one dimension, but also comprise two-dimensional pattern formation processes in the two-dimensional traffic network by virtue of the fact that, for example, one or more patterns of dense traffic branch off upstream via corresponding approach roads, that is to say extend upstream onto a plurality of route sections of the traffic network, with the result that finally a two-dimensional, branched pattern of dense traffic can form.

Figure 4:
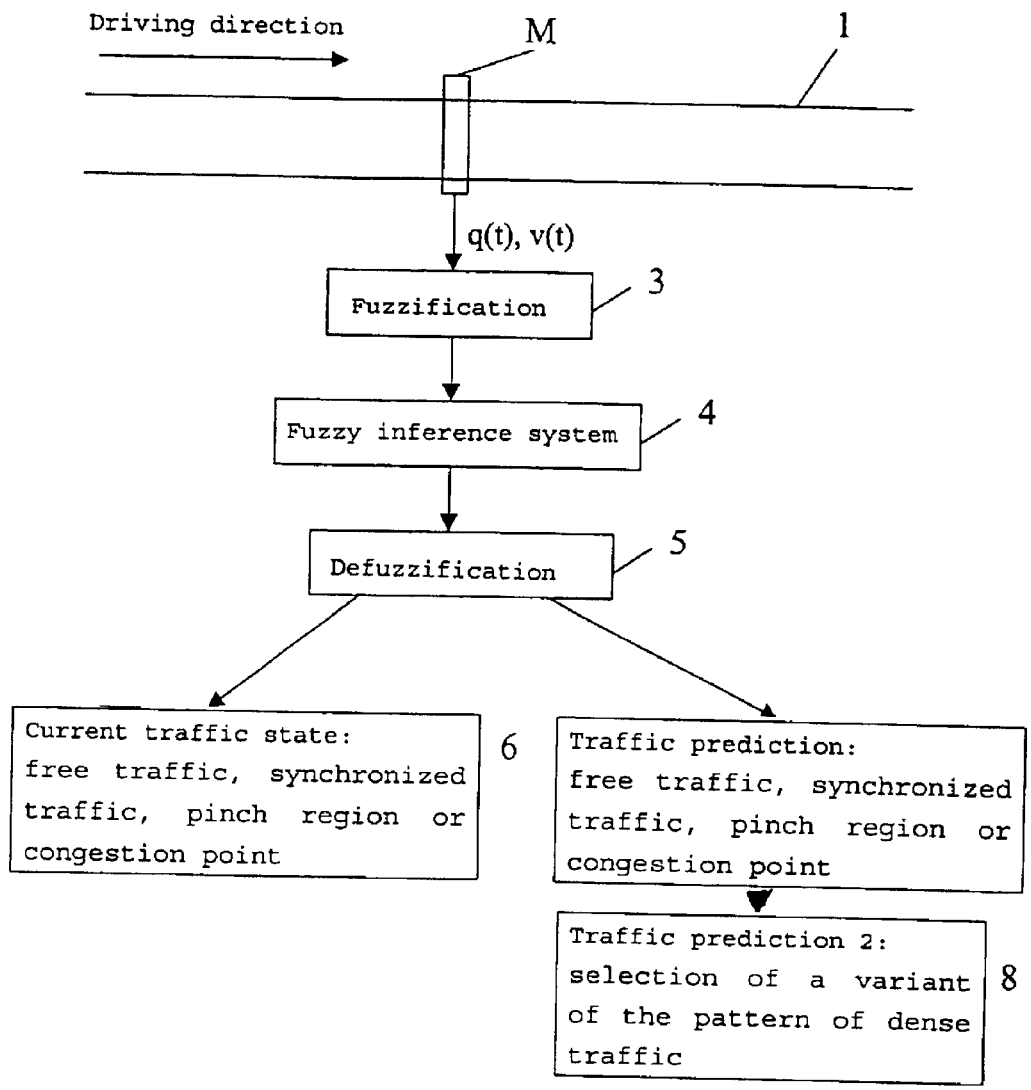
FIG. 4 is a diagram which shows a determination of current and future traffic states at a measuring point for the purpose of monitoring and predicting traffic states including patterns of dense traffic upstream of bottlenecks.
Figure 5:
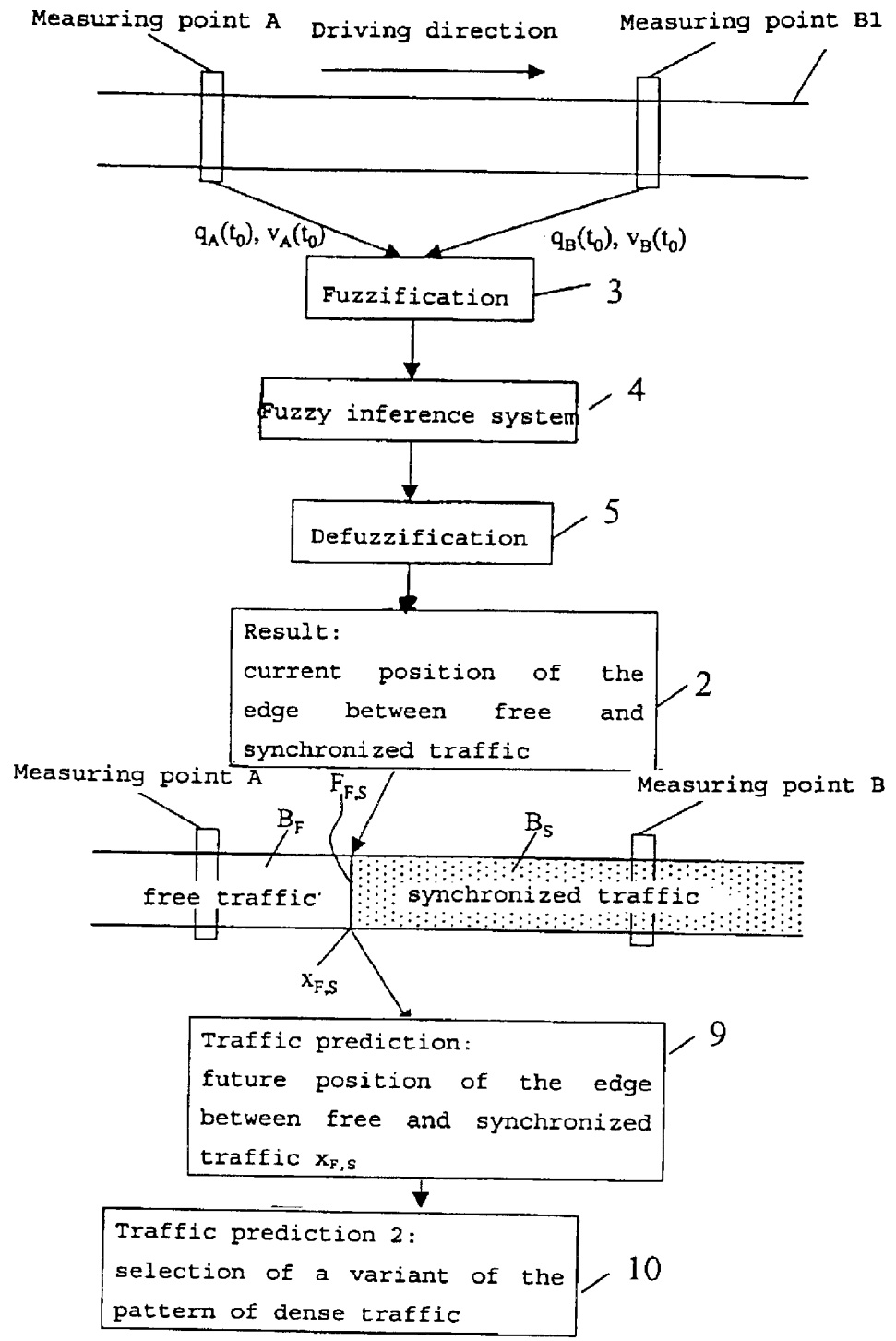
FIG. 5 shows a view corresponding to FIG. 4, but for the case of an edge, situated between two measuring points, between free and synchronized traffic.

Two application examples for the present method are illustrated in FIGS. 4 and 5 in a fashion combined with the method described in the above-mentioned German patent document DE 199 44 077 A1. FIG. 4 shows the classification of the current and future traffic state at a measuring point M of the directional lane 1, for example, of a motorway or motor highway. The traffic intensity q(t) and the average vehicle speed v(t) are measured continuously, that is to say in a time-dependent fashion, at the measuring point M and fed to a traffic centre for evaluation by a fuzzy logic system. This includes a unit 3 for fuzzifying the input variables, a fuzzy interference system 4 for deriving fuzzy result values by applying prescribable fuzzy rules to the fuzzified input variables, and a unit 5 for defuzzifying the fuzzy result values, that is to say for forming a crisp result value. Exactly one of the values of "free traffic", "synchronized traffic", "pinch region" or "congestion point" is output as a result for the current traffic state of the considered measuring point M, see block 6 in FIG. 4. In the case of the use of predicted instead of current values of the traffic intensity q(t) and the average speed v(t) the fuzzy logic system outputs as a result the traffic state at the measuring point M predicted for this future point in time, see block 7 of FIG. 4. The mode of procedure in the above-mentioned German patent document DE 199 44 077 A1, to which reference may be made, is described to this extent.

The present method is based thereon and additionally provides a further-reaching traffic prediction which is based on the prediction information obtained in accordance with block 7 of FIG. 4. Specifically, in this case the traffic state is classified in the fashion explained above with regard to the typical pattern of dense traffic for route sections upstream of effective bottlenecks of the traffic network, and the best-fitting pattern is selected from the stored pattern variants and associated profiles when the measuring point M forms an effective bottleneck and dense traffic forms upstream thereof because of a correspondingly large traffic volume, as illustrated by a block 8.

FIG. 5 shows a method example which is largely similar to that of FIG. 4 and additionally permits the detection of the upstream edge $F_{F,S}$ of a respective region $B_S$ of synchronized traffic even for positions $X_{F,S}$ between two measuring points A, B, including a prediction of this edge position $X_{F,S}$ even in such intermediate regions, see block 9 of FIG. 5. It is possible to this extent to refer once more to the description of this functionality in the above-mentioned German patent document DE 199 44 077 A1. The present method example is based thereon and uses the prediction data, obtained in accordance with block 9, on the extent and position of a respective region $B_S$ of synchronized traffic to make a further-reaching traffic prediction of the dense traffic forming there and in the region upstream thereof in accordance with the finding explained above and the temporal tracking of the associated typical pattern of dense traffic when the dense traffic is to be ascribed to an effective bottleneck in whose surroundings a downstream edge of the region $B_S$ of synchronized traffic remains fixed. As specified in block 10 of FIG. 5, for this purpose the predicted traffic data for this route section are used to select the best-fitting pattern variant of dense traffic from those stored, which is then used for further evaluation purposes and, in particular, for prediction purposes.

It goes without saying that, as explained above, the mode of procedure described above with the aid of FIGS. 4 and 5 can be used not only to determine current and predict future individual patterns of dense traffic in which only one effective bottleneck is involved, but also current or future "overarching" patterns of dense traffic, in which a plurality of effective bottlenecks are involved. In the latter case, the method is applied in parallel for the plurality of effective bottlenecks in an overarching pattern.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for monitoring a traffic state in a traffic network which may incur one or more effective bottlenecks, said method comprising:

recording measured traffic data for at least one traffic parameter, including at least one of information on traffic intensity and average vehicle speed;

based on the recorded information, classifying the traffic state into one of a plurality of state phases including at least the state phases of "free traffic" and "synchronized traffic"; wherein, when an edge fixed at an effective bottleneck of the traffic network is detected between downstream free traffic and upstream synchronized traffic, the traffic state upstream of said bottleneck is classified as conforming to pattern of dense traffic that is representative of the bottleneck, which pattern includes one or more different consecutive upstream regions of different state phase composition; and an associated profile of the traffic parameters is taken into account in classifying the state phase determination.

2. The method according to claim 1, wherein:

when an individual pattern of dense traffic arising initially at an effective bottleneck in a particular route section reaches a next preceding effective bottleneck in an upstream direction, classifying a traffic state in this particular route section as conforming to an overarching pattern, which overarching pattern is representative of included effective bottlenecks of dense traffic which, like a respective individual pattern, includes one or more different consecutive upstream regions of different state phase composition; and an associated profile of the traffic parameters is taken into account in classifying the traffic state phase.

3. The method according to claim 2, wherein:

for the traffic network, as a function of vehicle flows, determinations are made regarding i) a location and temporal sequence in which overarching patterns occur, ii) a temporal and spatial sequence in which regions of "synchronized traffic", "pinch region" and "moving widespread congestion" occur in each overarching pattern; and iii) whether overlaps of said regions take place; and for a particular overlap, temporal and spatial characteristics of congestion regions through regions of synchronized traffic or pinch regions are predicted.

4. The method according to claim 1, wherein:

a pattern assigned to an effective bottleneck, or an overarching pattern common to a plurality of effective bottlenecks, of dense traffic with a time-dependent and location-dependent traffic parameter profile, is empirically determined from recorded measured traffic data and stored in a manner which can be called up.

5. The method according to claim 4, wherein:

for a particular bottleneck, as a function of vehicle influx, a determination is made whether the pattern comprises one of three pattern variants, being i) only a region of synchronized traffic, ii) a region of synchronized traffic and a pinch region adjoining upstream, or iii) a region of synchronized traffic, a pinch region adjoining upstream and a region of moving widespread congestion adjoining farther upstream;

associated edge positions are determined between the respective different state phases; and each of the three pattern variants is assigned a corresponding time-dependent and location-dependent profile comprising information regarding at least one parameter selected from the group consisting of average vehicle speed, traffic flow, and the traffic density.

6. The method according to claim 5, wherein a temporal evolution is currently estimated, and predicted for future points in time, for at least one traffic condition selected from the group consisting of edge positions of the regions of a respective pattern of dense traffic, edge positions of congestion regions inside various overarching patterns, and occurrence of a new overarching pattern.

7. The method according to claim 5, wherein travel time for respective individual or overarching patterns of dense traffic are currently estimated or predicted for future points in time.

8. The method according to claim 5, wherein:

current vehicle influx data is detected for respective individual or overarching patterns of dense traffic;

current data indicative of positions of the edges between the pattern regions are determined;

the current data are used to select a best-fitting pattern profile from among stored pattern profiles; and the selected pattern profile is used as a basis for predicting a future traffic state in the relevant route region.

9. A method for traffic state monitoring in a traffic network in which effective bottlenecks may occur, said method comprising:

for each of a plurality of varying values of traffic influx to a particular effective bottleneck, determining a temporal/spatial profile for at least one pattern of dense traffic that is representative of the particular effective bottleneck, said profile including traffic parameters in a region upstream of the particular effective bottleneck;

storing said at least one pattern in a memory;

when a downstream edge between downstream free traffic and an upstream dense traffic phase is detected at said particular effective bottleneck, selecting a best fitting pattern from among said stored patterns, based on at least traffic influx to the particular effective bottleneck; and predicting a temporal/spatial profile of traffic parameters for the particular effective bottleneck using traffic parameter information associated with the selected pattern.

10. The method according to claim 9, wherein said selecting of a best fitting pattern comprises:

determining position of an upstream edge of said dense traffic phase;

determining traffic influx to at least one of said upstream edge and said downstream edge; and using determined edge position and traffic influx information as input data, selecting from the stored patterns, a pattern which best fits said input data.

11. The method according to claim 10, wherein said predicting comprises:

using determined position of said upstream edge, said selected pattern and said traffic influx information, predicting further development of said pattern.

* * * * *